(12) United States Patent
Duppong et al.

(10) Patent No.: US 8,925,964 B1
(45) Date of Patent: Jan. 6, 2015

(54) BALLAST ASSEMBLY

(71) Applicant: Deere & Company, Moline, IL (US)

(72) Inventors: Steven A. Duppong, Cedar Falls, IA (US); Bryan K. Buerkle, Cedar Falls, IA (US); Robert David Andrew Wolsky, Cando, ND (US); Lucas Aaron Laudenbach, Fargo, ND (US); James Gregory Johnson, Brooklyn Park, MN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/068,912

(22) Filed: Oct. 31, 2013

(51) Int. Cl.
*B60S 9/00* (2006.01)
*B62D 49/08* (2006.01)

(52) U.S. Cl.
CPC .................................. *B62D 49/085* (2013.01)
USPC ............................. 280/759; 212/195; 414/719

(58) Field of Classification Search
CPC .............. B62D 49/085; B62D 49/0628; B66F 9/07554; E02F 9/18
USPC .................. 280/755, 758, 759; 212/195–198; 414/673, 719
See application file for complete search history.

(56) References Cited

U.S. PATENT DOCUMENTS

| | | | | | |
|---|---|---|---|---|---|
| 3,853,231 | A | * | 12/1974 | Luttrell | 414/719 |
| 4,232,883 | A | * | 11/1980 | Bourgeous et al. | 280/759 |
| 5,131,802 | A | * | 7/1992 | Sunami et al. | 414/719 |
| 6,988,560 | B2 | * | 1/2006 | Bay | 172/272 |
| 7,354,066 | B2 | * | 4/2008 | Yamamoto | 280/759 |
| 7,669,898 | B2 | * | 3/2010 | Hamaguchi et al. | 280/759 |
| 8,118,326 | B2 | * | 2/2012 | Moore | 280/759 |
| 8,434,787 | B2 | * | 5/2013 | Halepatali et al. | 280/759 |

FOREIGN PATENT DOCUMENTS

EP 2441651 A2 4/2012

* cited by examiner

*Primary Examiner* — Paul N Dickson
*Assistant Examiner* — Robert A Coker

(57) ABSTRACT

A ballast assembly for a work vehicle includes a ballast weight having a central groove. Two pairs of coupling pins extend across the central groove. A pair of support rods are attached to an underside of a frame part of the vehicle. The assembly also includes a pair of ballast bracket, each of which is releasably coupled to a corresponding pair of the coupling pins. The assembly also includes a pair of links, each having an end pivotally coupled to a corresponding ballast bracket, and having a body with a slot which slidably receives a corresponding support rod. A hydraulic cylinder has a first end pivotally coupled to one of the links and a second end pivotally coupled to the frame part. Each ballast bracket includes a latch member which releasably holds the ballast bracket to the corresponding pair of coupling pins.

19 Claims, 6 Drawing Sheets

BALLAST ASSEMBLY

FIELD

The present disclosure relates to a ballast assembly for a work vehicle.

BACKGROUND

It is known to ballast a work vehicle, such as a tractor, to accommodate for various mounted implements. Suitcase weights are mounted to the front of the tractor main frame when forward located ballast is desired, and wheel weights are attached to the rear wheels when rearward located ballast is desired. Typically, the mounting of the suitcase weights to the main frame has required the mounting of a separate U-shaped bracket to the front of the main frame while wheel weights are somewhat specially made and are cumbersome to mount.

It is often desired to change the ballast of the tractor to fit different implements or tasks. For some tasks, like heavy draft pulling, a large ballast weight is needed to improve traction and pull efficiency of the tractor. For some tasks, like high speed transport, ballast may be removed to improve fuel efficiency and increase payload capability. It is desired to have a ballast assembly with which a ballast weight can be quickly attached and detached from a work vehicle.

SUMMARY

According to an aspect of the present disclosure, a ballast assembly is attached to an underside of a work vehicle. The ballast assembly includes a ballast weight which has a central groove in an upper surface thereof. Two pairs of coupling pins extend across the central groove. Two support rods are attached to an underside of a frame part of the vehicle. A first ballast bracket is releasably coupled to the first pair of coupling pins, and a second ballast bracket is releasably coupled to the second pair of coupling pins. A first link has an end pivotally coupled to the first ballast bracket, and has a body which slidably engages the first support rod. A second link has an end pivotally coupled to the second ballast bracket, and has a body which slidably engages the second support rod. An adjustable length actuator, such as a hydraulic cylinder has a first end pivotally coupled to one of the links and having a second end pivotally fixed to the frame part. Each link has a slot which slidably receives a corresponding one of the support rods.

Each ballast bracket has a body and a pair of curved arms which form a corresponding pair of forwardly opening recesses. Each pair of recess removably receives a corresponding pair of the coupling pins. Each ballast bracket includes a flange which projects from the body, and each flange is pivotally coupled to an end of one of the links. Each ballast bracket includes a latch member which releasably holds the ballast bracket to the corresponding pair of coupling pins. Each ballast bracket includes a latch slot which extends into the body. The latch member includes a bar which is pivotally supported on the body and a latch tab which projects from the bar through the latch slot towards the coupling pin.

DETAILED DESCRIPTION OF THE DRAWINGS

Figure 1:
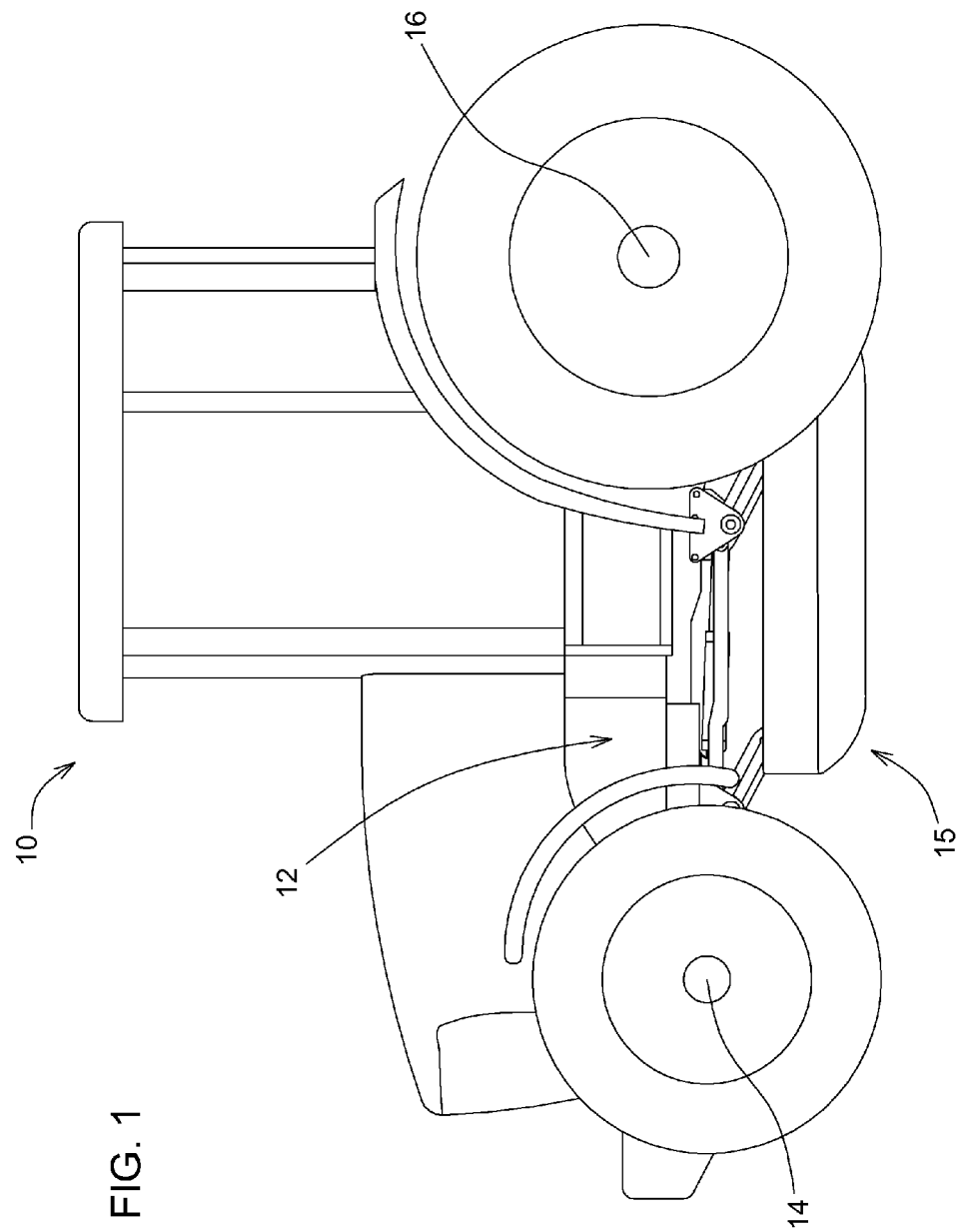
FIG. 1 is a side view of a tractor with the a ballast assembly embodying the invention.
Figure 2:
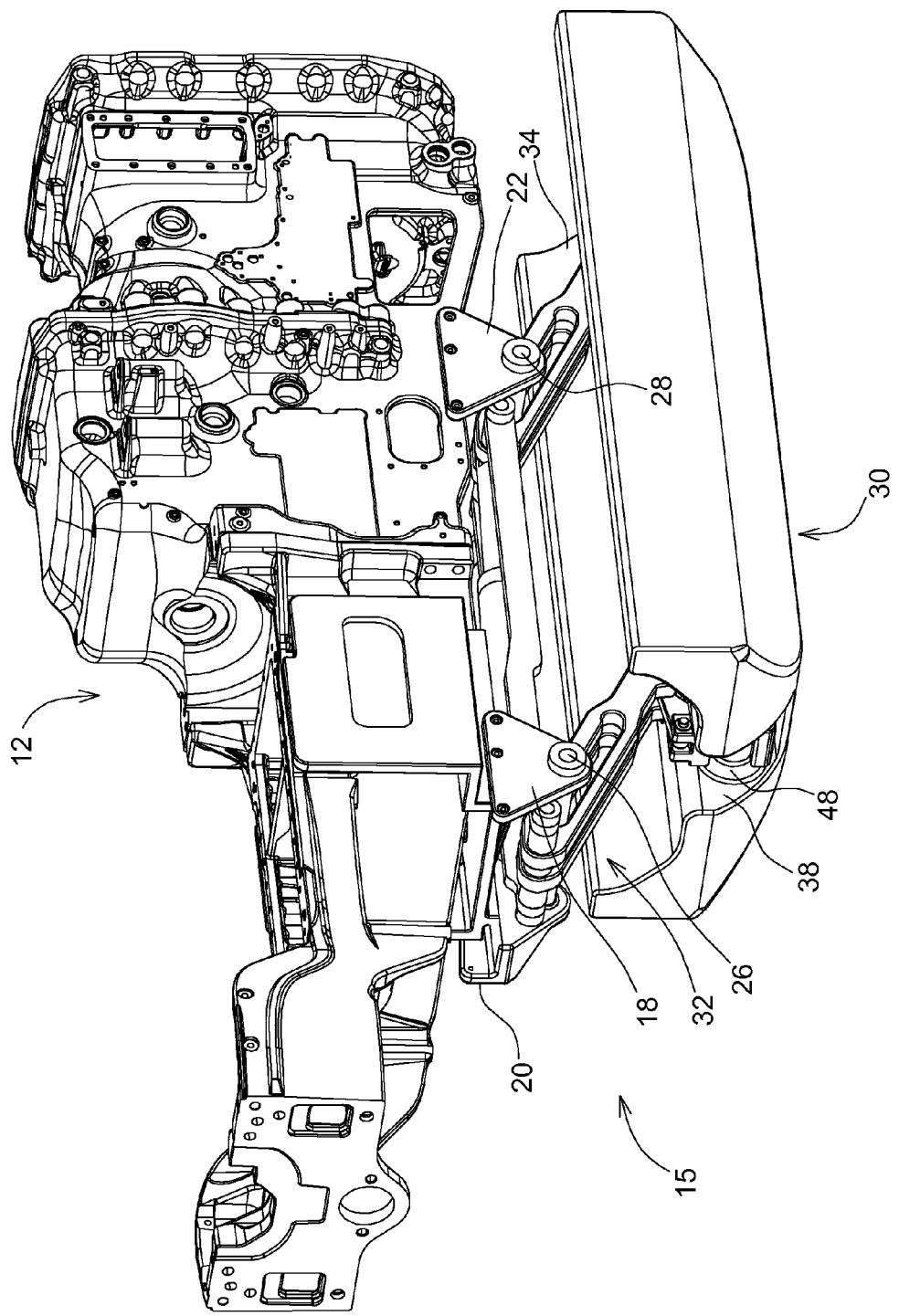
FIG. 2 is a front side perspective view of the ballast assembly of FIG. 1.

Referring to FIGS. 1 and 2, a work vehicle 10, such as a tractor, includes a frame part, such as a transmission housing 12 which is positioned between the front axle 14 and the rear axle 16. A ballast weight assembly 15 is attached to an underside of the transmission housing 12.

Figure 3:
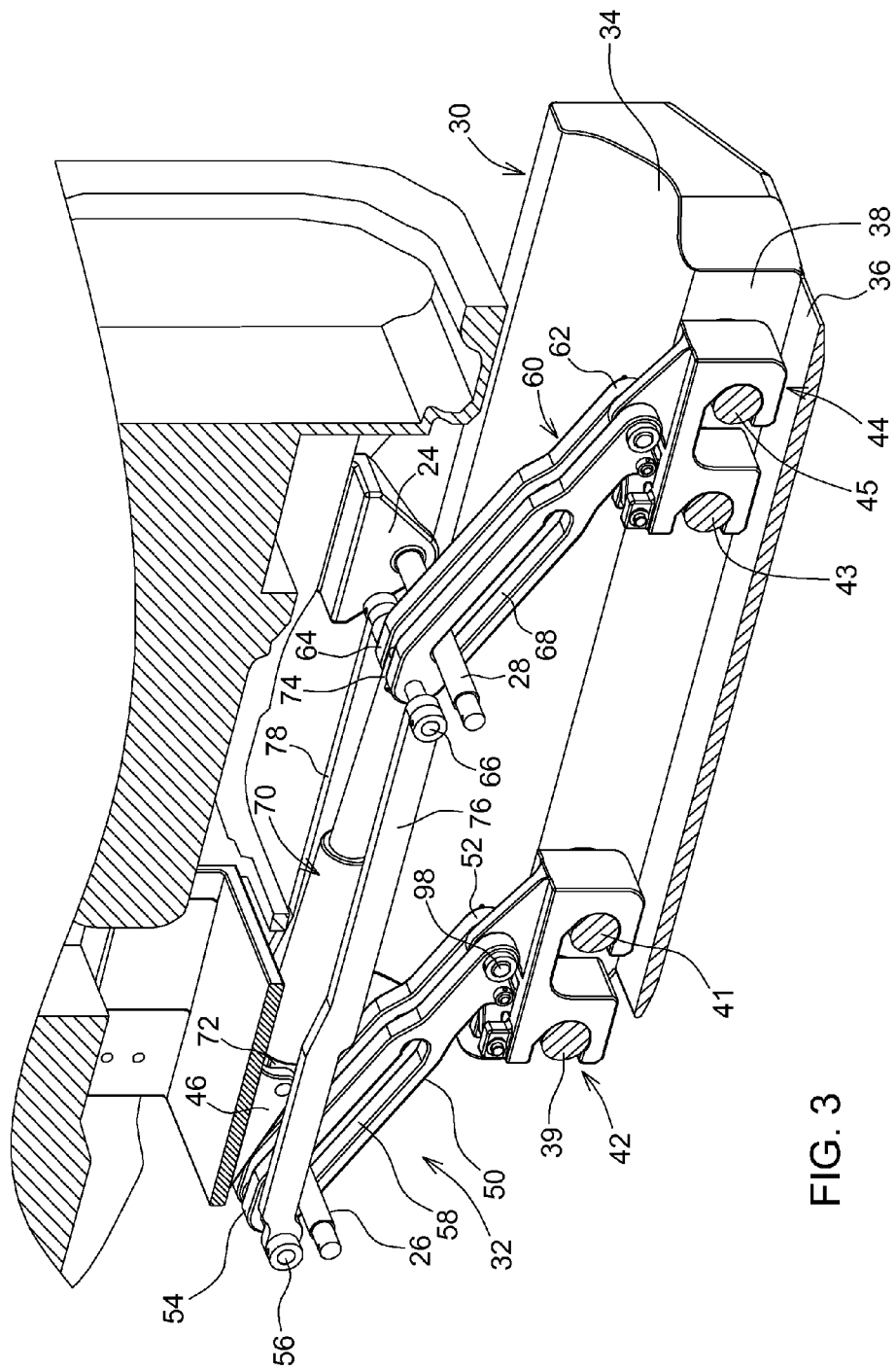
FIG. 3 is a sectional view along lines 3-3 of FIG. 2.

As best seen in FIGS. 2 and 3, a pair of front supports 18 and 20 are spaced laterally apart and are attached to the underside of the housing 12. A pair of rear supports 22 and 24 are spaced laterally apart and are attached to the underside of the housing 12. The rear supports 22 and 24 are spaced apart rearwardly from the front supports 18 and 20. A front rod 26 is supported by and extends between the front supports 18 and 20. A rear rod 28 is supported by and extends between the rear supports 22 and 24.

Figure 4:
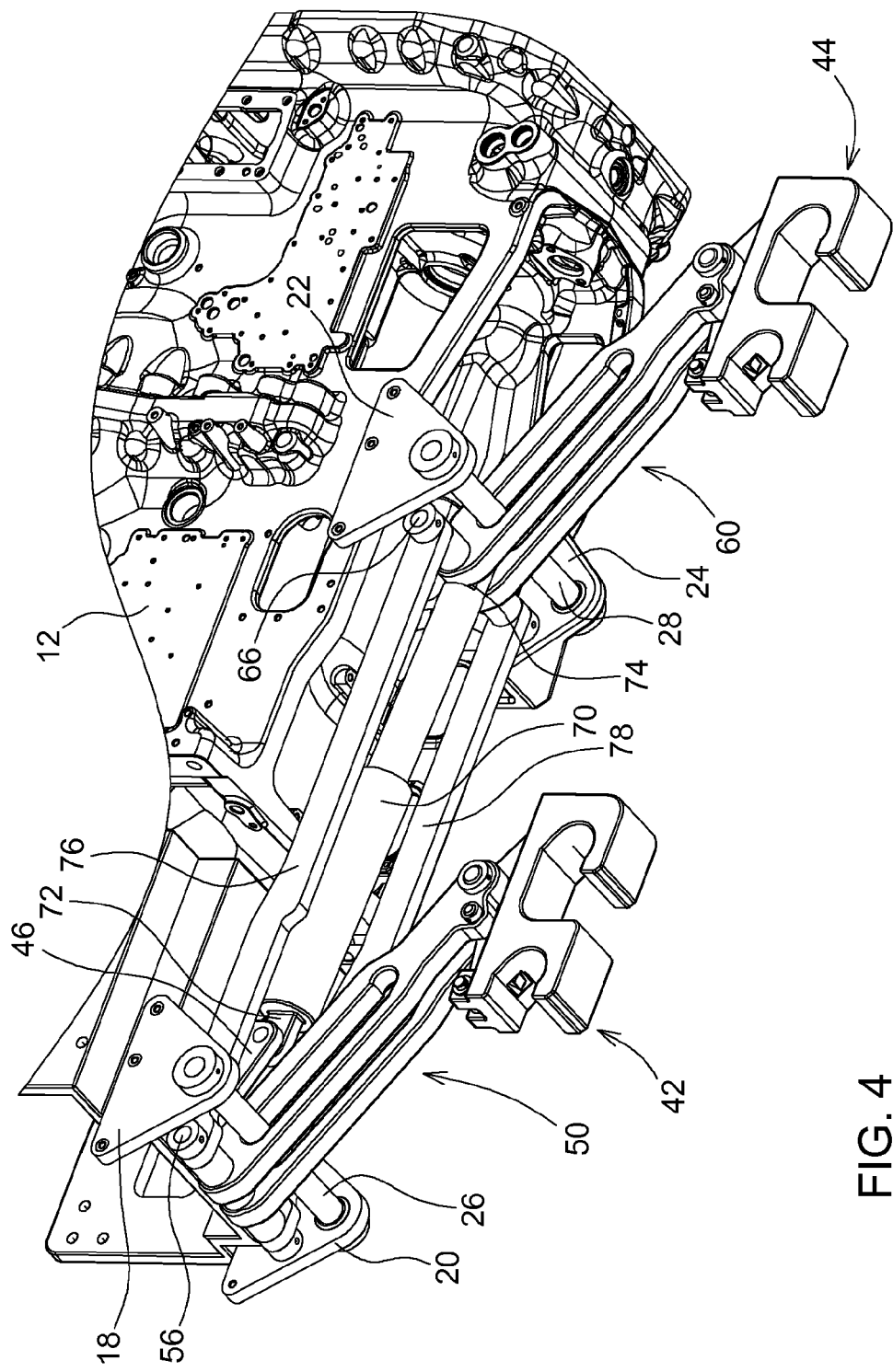
FIG. 4 is a bottom side perspective view of the structure of FIG. 3.

A ballast weight 30 is coupled to the front and rear supports by a lift arm assembly 32. As best seen in FIGS. 2, 3 and 4, the ballast weight 30 has an upwardly opening, fore-and-aft extending recess 34 and a central groove 36 with side walls 38 and 40. A front ballast bracket 42 is coupled in a forward portion of the groove 36 to pins 39 and 41, and rear ballast bracket 44 is coupled in a rear portion of the groove 36 to pins 43 and 45. Pins 39, 41, 43 and 45 extend across grove 36 from wall 38 to wall 40. An actuator bracket 46 is also fixed to the underside of the transmission housing 12. The ballast weight 30 can be any weight. Preferably, the weight 30 would be designed in such a fashion that it maintains a desired weight split between the front and rear axles.

A two-piece front link 50 includes a rear lower end 52 which is pivotally coupled to the front ballast bracket 42, a forward front end 54 pivotally coupled to a pin 56, and an elongated slot 58 which slidably receives the front rod 26. A two-piece rear link 60 includes a rear lower end 62 which is pivotally coupled to the rear ballast bracket 44, a forward front end 64 pivotally coupled to a pin 66, and an elongated slot 68 which slidably receives the rear rod 28. An extendable and retractable actuator, 70, such as a hydraulic cylinder, includes a forward end 72 which is pivotally coupled to the bracket 46. The actuator 70 also includes a rear end 74 which is pivotally coupled to the pin 66 between the two pieces of the rear link 60. As best seen in FIGS. 3 and 4, a pair of alignment bars 76 and 78 are coupled to the pins 56 and 66, and are positioned on opposite sides of the cylinder 70.

Figure 5:
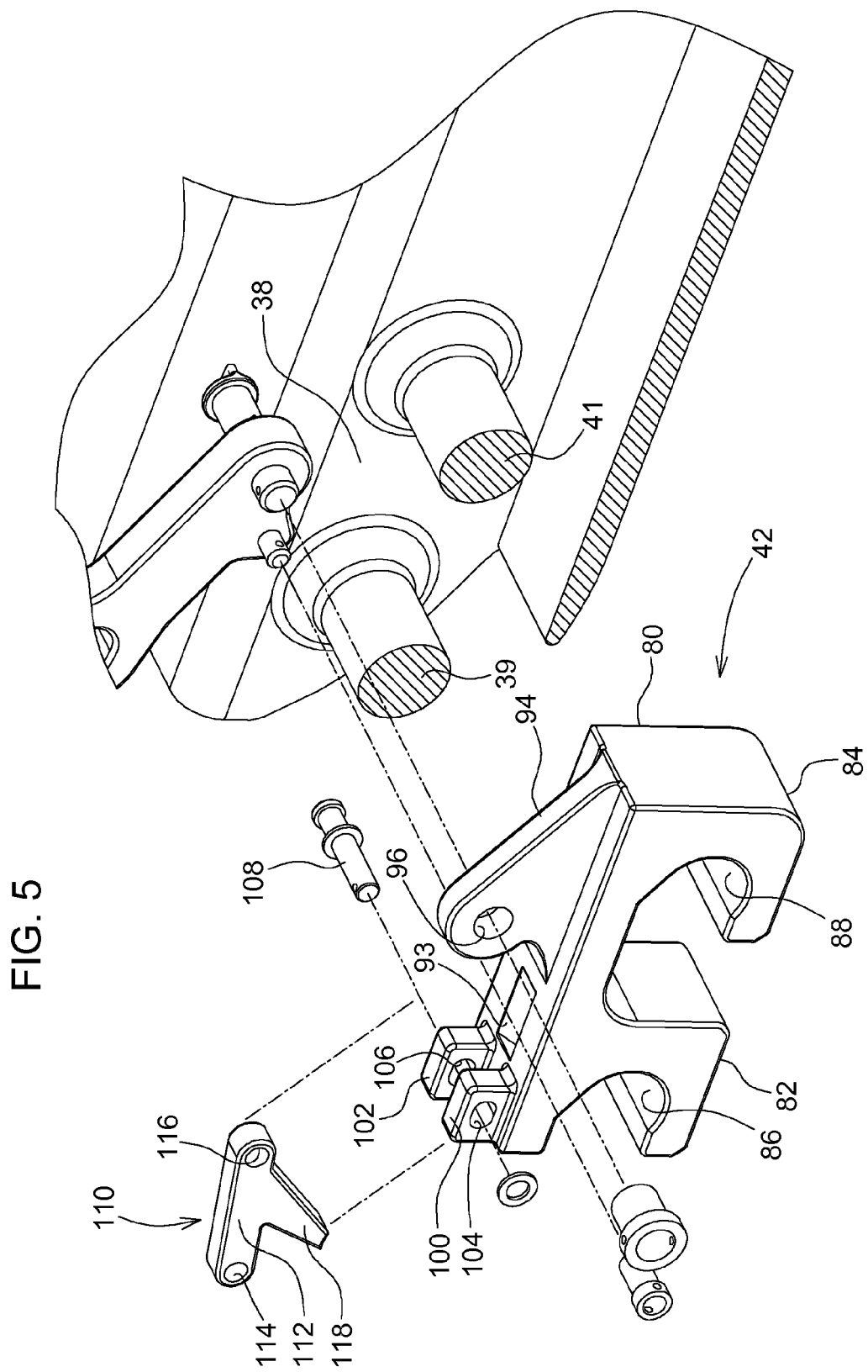
FIG. 5 is an enlarged exploded view of a portion of FIG. 3.
Figure 6:
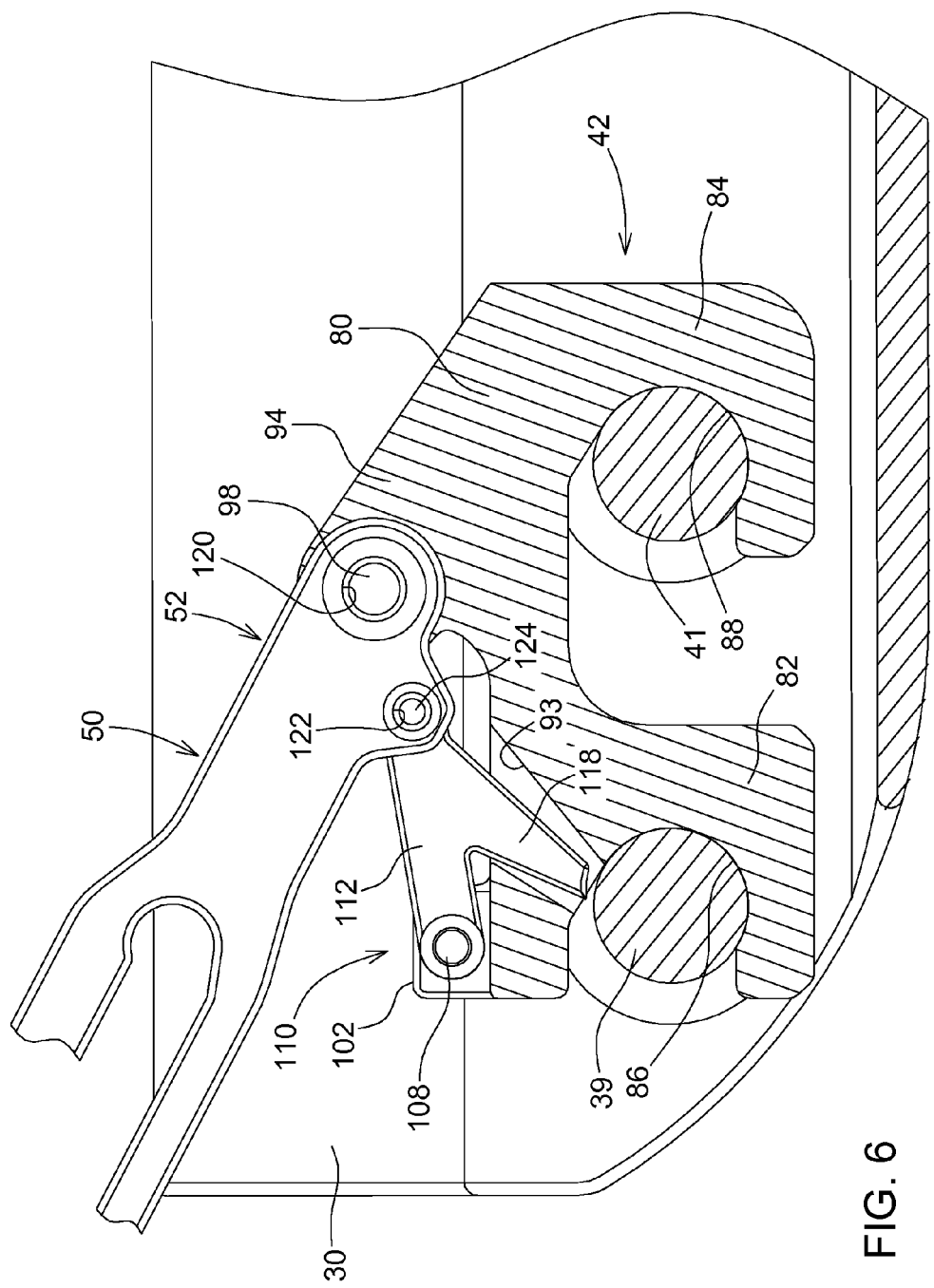
FIG. 6 is a sectional view of the structure of FIG. 4.

Referring now to FIGS. 4, 5 and 6, the front ballast bracket 42 includes a body 80 and a pair of curved arms 82 and 84 which form rounded forwardly opening recesses 86, and 88, respectively. The recesses 86 and 88 removably receive corresponding pins 39 and 41. A flange 94 projects from the top of body 80 and includes a bore 96. Bore 96 receives a coupling pin 98 which is pivotally coupled to the lower rear ends 52 of link 50. A latch slot 93 opens at the upper surface of body 80 and extends downwardly and forwardly into the body 80.

A pair of tabs 100, 102 project upwardly from a forward end of body 80. Bores 104 and 106 extend though tabs 100 and 102, respectively. Bores 104 and 106 receive a latch pin 108. A latch member 110 includes a bar 112 with bores 114 and 116 at opposite ends thereof. The latch member 110 also includes a latch tab 118 which extends forwardly and downwardly from bar 112. Latch tab 118 is engagable with pin 39 to releasably hold bracket 42 to the pins 39 and 41. As best seen in FIG. 5, the lower rear end 52 of the link 50 has a coupling bore 120 which receives the coupling pin 98 and a latch bore 122. A pin 124 is received by bore 122 and bore 116 and pivotally couples the link 50 to the latch member 110. the latch tab 118 is received by the latch slot 93. The rear ballast bracket 44 has similar structure which releasably holds the rear ballast bracket 44 to pins 43 and 45.

Referring now to FIGS. 3 and 5, the cylinder 70 is extended and the weight 30 is in a fully lowered position. In this lowered position, the latch tab 118 of latch member 110 is pulled away from the pin 39 and the weight 30 can be moved to the left relative to the bracket 42 and the pins 39 and 41 can be removed from recesses 86 and 88, respectfully. As the cylinder 70 is retracted, the link 50 rotates counter-clockwise with respect to the bracket 42. This causes latch member 110 to rotate clockwise around pin 108 until an end of latch tab 118 engages an upper surface of pin 39 and thereby prevent removal of the ballast weight 30 from the bracket 42. The latch mechanism of the rear bracket 44 operates in a similar manner.

The result is an assembly which movably mounts a large weight between the front and rear axles of the tractor below the chassis. The weight can be quickly lowered to the ground by the links that are coupled to the chassis. This allows for rapid change in tractor ballast. The operator would locate the large weight on the ground and line the tractor up to this weight. The tractor is then positioned over the weight and the links are lowered and moved to engage the weight. The links are then raised. The safety latch moves into place at the top of the lift stroke to prevent unwanted lowering of the weight.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. For example, although the design is shown attached to a row crop chassis, it could be attached to other types of tractors and work vehicles. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A ballast assembly for a work vehicle, the ballast assembly comprising:
   a ballast weight;
   a first support rod attached to an underside of a frame part of the vehicle;
   a second support rod attached to an underside of a frame part of the vehicle and spaced apart from the first support rod;
   a first link having an end pivotally coupled to the ballast weight, and having a body which slidably engages the first support rod;
   a second link having an end pivotally coupled to the ballast weight, and having a body which slidably engages the second support rod; and
   an adjustable length actuator having a first end pivotally coupled to one of the links and having a second end pivotally coupled to the frame part.

2. The ballast assembly of claim 1, wherein:
   the ballast weight includes an upwardly opening central groove, and at least two coupling pins extend across the central groove;
   a first ballast bracket coupled to an end of the first link; and
   a second ballast bracket coupled to an end of the second link, each ballast bracket releasably receiving at least a corresponding one of the coupling pins.

3. The ballast assembly of claim 2, wherein:
   each ballast bracket comprises a body and a curved arm which forms a forwardly opening recess, the recess removably receiving a corresponding one of the coupling pins.

4. The ballast assembly of claim 3, wherein:
   each ballast bracket comprises a flange which projects from the body, the flange being pivotally coupled to an end of one of the links.

5. The ballast assembly of claim 2, wherein:
   each ballast bracket comprises a latch member which releasably holds the ballast bracket to the coupling pin.

6. The ballast assembly of claim 5, wherein:
   each ballast bracket comprises a body and a latch slot which extends into the body; and
   the latch member comprises a bar which is pivotally supported on the body and a latch tab which projects from the bar through the latch slot towards the coupling pin.

7. The ballast assembly of claim 1, wherein:
   each link has a slot which slidably receives a corresponding one of the support rods.

8. The ballast assembly of claim 1, wherein:
   the ballast weight includes a central groove;
   a first pair of coupling pins extend across the central groove;
   a second pair of coupling pins extend across the central groove;
   a first ballast bracket coupled to an end of the first link; and
   a second ballast bracket coupled to an end of the second link, each ballast bracket releasably receiving a corresponding pair of the coupling pins.

9. The ballast assembly of claim 8, wherein:
   each ballast bracket comprises a body and a pair of curved arms which form a corresponding pair of recesses, each pair of recess removably receiving a corresponding pair of the coupling pins.

10. The ballast assembly of claim 9, wherein:
    each ballast bracket comprises a flange which projects from the body, each flange being pivotally coupled to an end of one of the links.

11. The ballast assembly of claim 8, wherein:
    each ballast bracket comprises a latch member which releasably holds the ballast bracket to the corresponding pair of coupling pins.

12. The ballast assembly of claim 11, wherein:
    each ballast bracket comprises a body and a latch slot which extends into the body; and
    the latch member comprises a bar which is pivotally supported on the body and a latch tab which projects from the bar through the latch slot towards the coupling pin.

13. The ballast assembly of claim 8, wherein:
    each link has a slot which slidably receives a corresponding one of the support rods.

14. A ballast assembly for a work vehicle, the ballast assembly comprising:
    a ballast weight having a central groove formed therein, a first pair of coupling pins extend across the central groove, and a second pair of coupling pins extend across the central groove;

a first support rod attached to an underside of a frame part of the vehicle;

a second support rod attached to an underside of a frame part of the vehicle and spaced apart from the first support rod;

a first ballast bracket for releasably coupling to the first pair of coupling pins;

a second ballast bracket for releasably coupling to the second pair of coupling pins;

a first link having an end pivotally coupled to the first ballast bracket, and having a body which slidably engages the first support rod;

a second link having an end pivotally coupled to the second ballast bracket, and having a body which slidably engages the second support rod; and an adjustable length actuator having a first end pivotally coupled to one of the links and having a second end pivotally coupled to the frame part.

15. The ballast assembly of claim 14, wherein:

each ballast bracket comprises a body and a pair of curved arms which form a corresponding pair of forwardly opening recesses, each pair of recess removably receiving a corresponding pair of the coupling pins.

16. The ballast assembly of claim 15, wherein:

each ballast bracket comprises a flange which projects from the body, each flange being pivotally coupled to an end of one of the links.

17. The ballast assembly of claim 14, wherein:

each ballast bracket comprises a latch member which releasably holds the ballast bracket to the corresponding pair of coupling pins.

18. The ballast assembly of claim 17, wherein:

each ballast bracket comprises a body and a latch slot which extends into the body; and the latch member comprises a bar which is pivotally supported on the body and a latch tab which projects from the bar through the latch slot towards the coupling pin.

19. The ballast assembly of claim 14, wherein:

each link has a slot which slidably receives a corresponding one of the support rods.

\* \* \* \* \*